US011822608B2

(12) United States Patent  
Lonsdorf et al.

(10) Patent No.: US 11,822,608 B2  
(45) Date of Patent: *Nov. 21, 2023

(54) LEARNING AFFINITIES THROUGH DESIGN VARIATIONS

(71) Applicant: salesforce.com, inc., San Francisco, CA (US)

(72) Inventors: Brian J. Lonsdorf, Moss Beach, CA (US); Jessica Lundin, Seattle, WA (US); Owen Winne Schoppe, Orinda, CA (US); Sönke Rohde, San Francisco, CA (US); Alan Ross, San Francisco, CA (US); David James Woodward, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,258

(22) Filed: Oct. 24, 2022

(65) Prior Publication Data

US 2023/0039283 A1     Feb. 9, 2023

Related U.S. Application Data

(63) Continuation of application No. 17/096,830, filed on Nov. 12, 2020, now Pat. No. 11,481,449.

(60) Provisional application No. 62/936,120, filed on Nov. 15, 2019.

(51) Int. Cl.  
    *G06F 16/00*     (2019.01)  
    *G06F 16/9035*   (2019.01)  
    *G06F 16/904*    (2019.01)  
    *G06F 16/9038*   (2019.01)  
    *G06F 16/9535*   (2019.01)

(52) U.S. Cl.  
    CPC ........ *G06F 16/9035* (2019.01); *G06F 16/904* (2019.01); *G06F 16/9038* (2019.01); *G06F 16/9535* (2019.01)

(58) Field of Classification Search  
    CPC .................................................. G06F 16/9535  
    See application file for complete search history.

(56) References Cited

U.S. PATENT DOCUMENTS

2017/0323023 A1    11/2017   Ilyas et al.  
2021/0149961 A1    5/2021    Lonsdorf et al.

*Primary Examiner* — Ajith Jacob  
(74) *Attorney, Agent, or Firm* — Sterne, Kessler, Goldstein & Fox P.L.L.C.

(57) ABSTRACT

Disclosed herein are system, method, and computer program product embodiments for determining a user-preferred feature type. An embodiment operates by maintaining user-presented features associated with user-presented records, wherein the user-presented features comprise one or more user-presented feature types. After receiving a user-desired feature of the user-presented features, a user-preferred feature type of the user-presented feature types is determined based on the user-presented features and the user-desired feature. Thereafter, a new record and associated feature are to be presented with the new feature being of the user-preferred type.

20 Claims, 11 Drawing Sheets

LEARNING AFFINITIES THROUGH DESIGN VARIATIONS

CROSS REFERENCE TO RELATED APPLICATIONS

This application claims the benefit of U.S. Provisional Application No. 62/936,120, filed on Nov. 15, 2019, which is incorporated by reference herein in its entirety. This application is further related to U.S. patent application Ser. No. 17/096,830, filed Nov. 12, 2020, entitled "Learning Affinities Through Design Variations," which is incorporated by reference herein in its entirety.

BACKGROUND

When service providers present records, they typically present the products' attributes in different user interfaces. For example, service providers may present a series of records relating to a product (e.g., clothing) and associated attributes (e.g., an image, a brief description, and a price) on an initial user interface. Only after selecting a particular record (e.g., a t-shirt or a pair of pants) do service providers present different attributes (e.g., additional images of the record, reviews, and dimensions) of the particular record than those previously presented. Accordingly, a user may be interested in a particular attribute (e.g., reviews) that is not illustrated in a first user interface presenting the record (e.g., a t-shirt). Thus, the user may be provided with multiple user interfaces before being presented with the particular attribute of interest.

Along these lines, when presenting records (e.g., a t-shirt), service providers typically present the same associated attributes (e.g., an image, a brief description, and a price). However, users may not be interested in the same attributes of the records. In other words, users may have affinities for specific attributes of the records. For instance, a particular user may be interested in one attribute (e.g., reviews), and another user may be interested in a different attribute (e.g., a design). Accordingly, when presenting records, service providers are unable to accurately provide user-preferred attributes on the initially presented user interface.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for determining user-preferred attributes. In some embodiments, a frontend server may send records and associated attributes to be presented to a user over a period of time. The records and associated attributed may be presented to the user in different user interfaces. As such, the frontend server may determine a user-desired attribute based on the user-presented attributes. The frontend server sends the user-desired attribute and/or user-presented attributes to a backend server.

The backend server maintains a user profile comprising previous user-presented attributes. After receiving the user-desired attribute and/or new user-presented attributes, the backend server determines a user-preferred attribute type based on the user-desired attributes and the new and previous user-presented attributes. In some embodiments, the backend server determines the user-preferred attribute type using an analysis of variance (ANOVA), which may include an f-test. The backend server then sends the user-preferred attribute type to the frontend server, which may then provide new records with new attributes of the user-preferred attribute type to the user.

Figure 1:
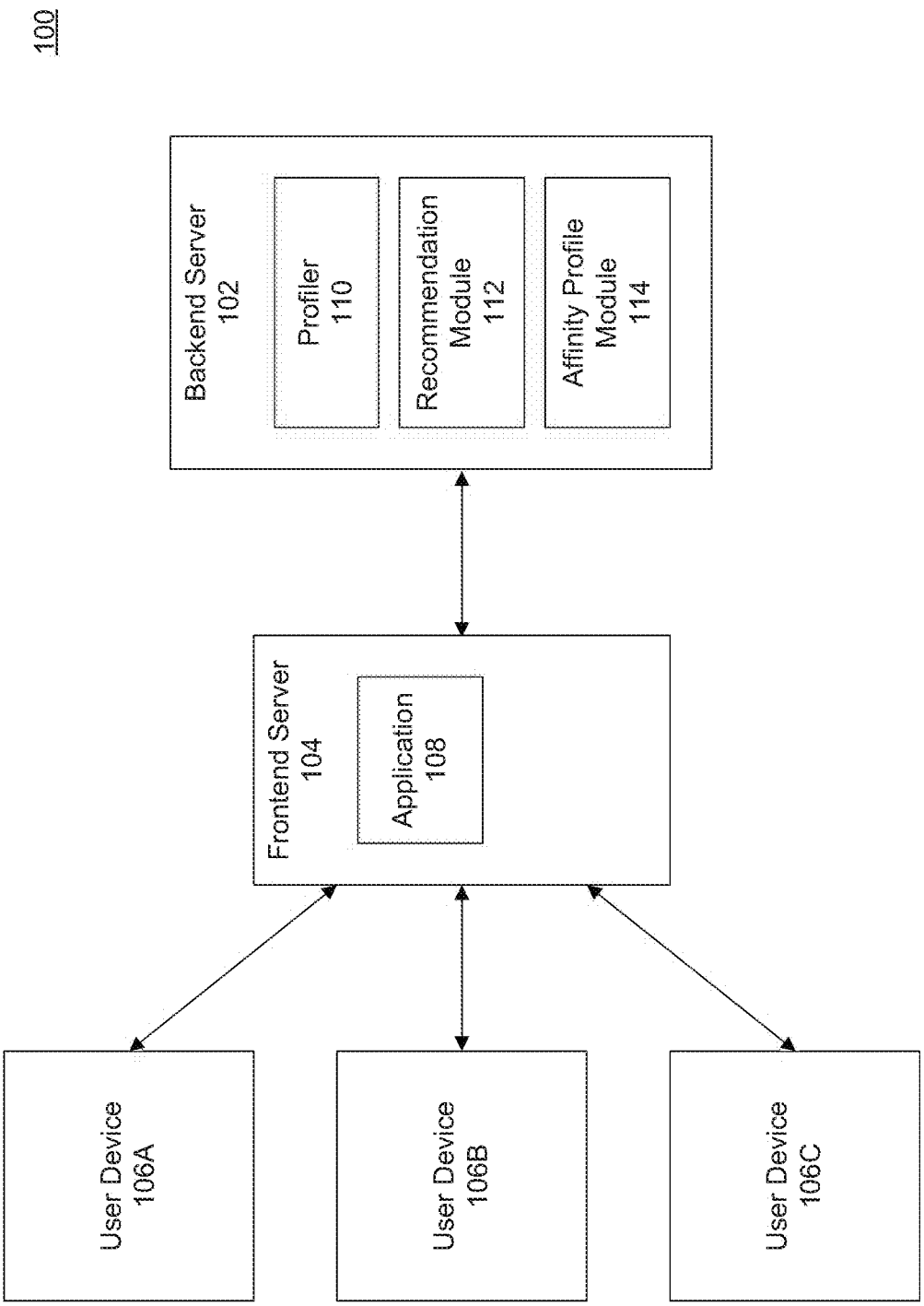
FIG. 1 is a block diagram of a system for determining user-preferred attributes, according to some embodiments.

FIG. 1 illustrates a system 100 for determining user-preferred attributes. System 100 includes backend server 102, frontend server 104, and/or user devices 106A-C. Backend server 102 determines user-preferred records and/or user-preferred attributes. Frontend server 102 includes an application 108 for providing user interfaces comprising records and/or associated attributes to user devices 106A-C. User devices 106A-C may be any type of computing device capable of processing application 108 and displaying user interfaces comprising records and/or associated attributes.

As illustrated, in some embodiments, backend server 102 and frontend server 104 may be separate servers. Although not illustrated, alternatively, the functions of backend server 102 and frontend server 104 may be integrated into a single server and perform the functions described herein. Along these lines, in some embodiments, backend server 102 and frontend server 104 may be managed by separate service providers. Alternatively, backend server 102 and frontend server 104 may be managed by the same service provider.

As discussed above, frontend server 104's application 108 provides user interfaces comprising records and/or associated attributes to user devices 106A-C. Records may be an account of a specific thing (e.g., shoes, t-shirts, a restaurant). Attributes may be a specific characteristic or inherent part of the record (e.g., a unique design, a great rating, and a specific dimension). For example, if records are shoes and t-shirts, attributes may be a specific price, specific review, available designs, to provide a few examples. Along these lines, records and attributes may be of various types. Record types be a general category (e.g., clothing and restaurants) of the specific record. Likewise, attribute types may be a general category of the specific characteristic or inherent part (e.g., prices, reviews, and available designs.

Accordingly, frontend server 104's application 108 may provide user interfaces presenting records and/or associated attributes of various record types and/or attribute types, respectively. In doing so, frontend server 104's application 108 may receive user-preferred records and/or associated attributes from backend server 102. As such, frontend server 104's application 108 may provide user interfaces having different combinations of record types and attributes to user devices 106A-C. In some embodiments, to do so, frontend server 104's application 108 may utilize A/B testing.

Figure 2:
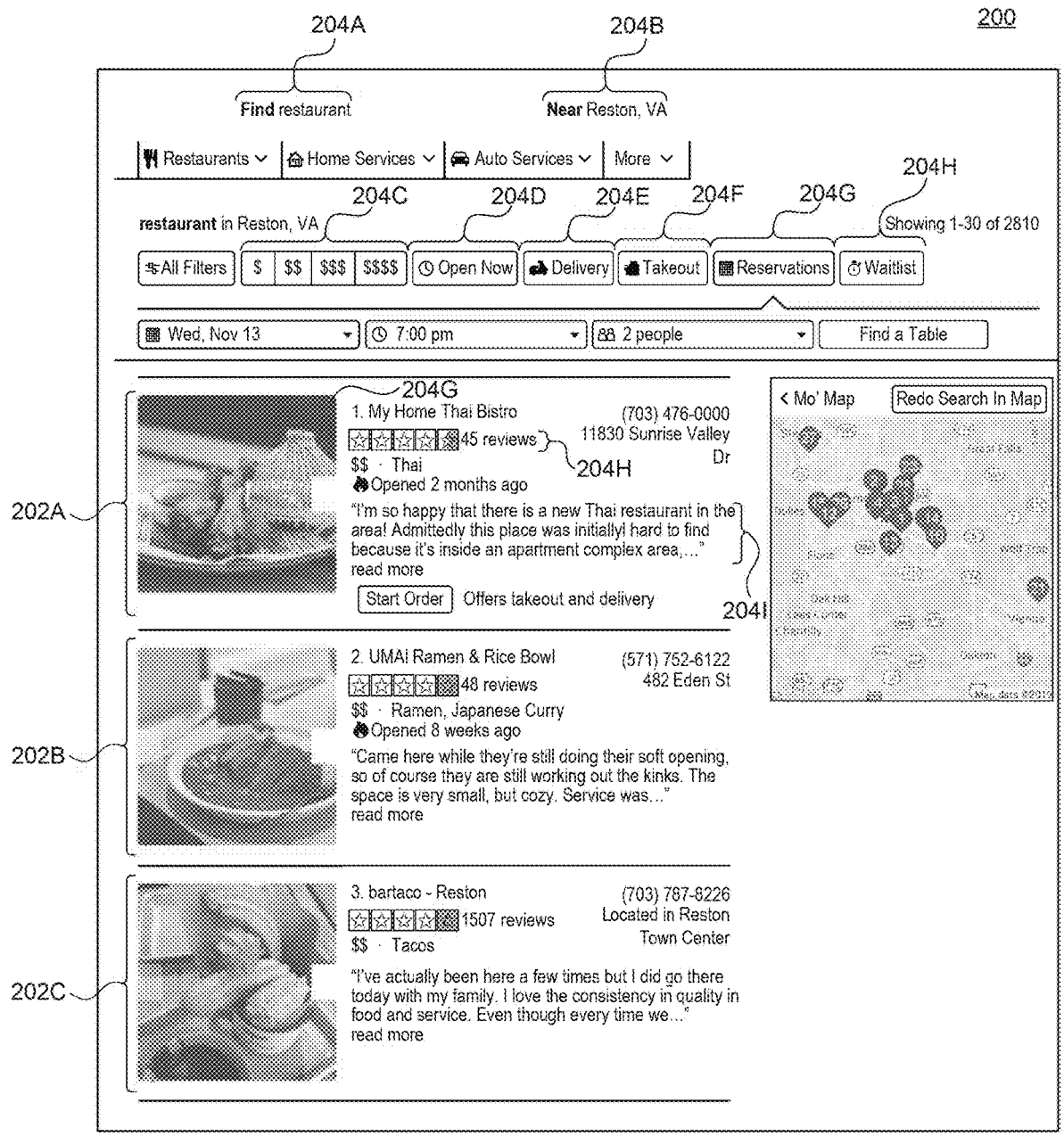
FIGS. 2-6 are user interfaces for learning user-preferred attributes, according to some embodiments.
Figure 3:
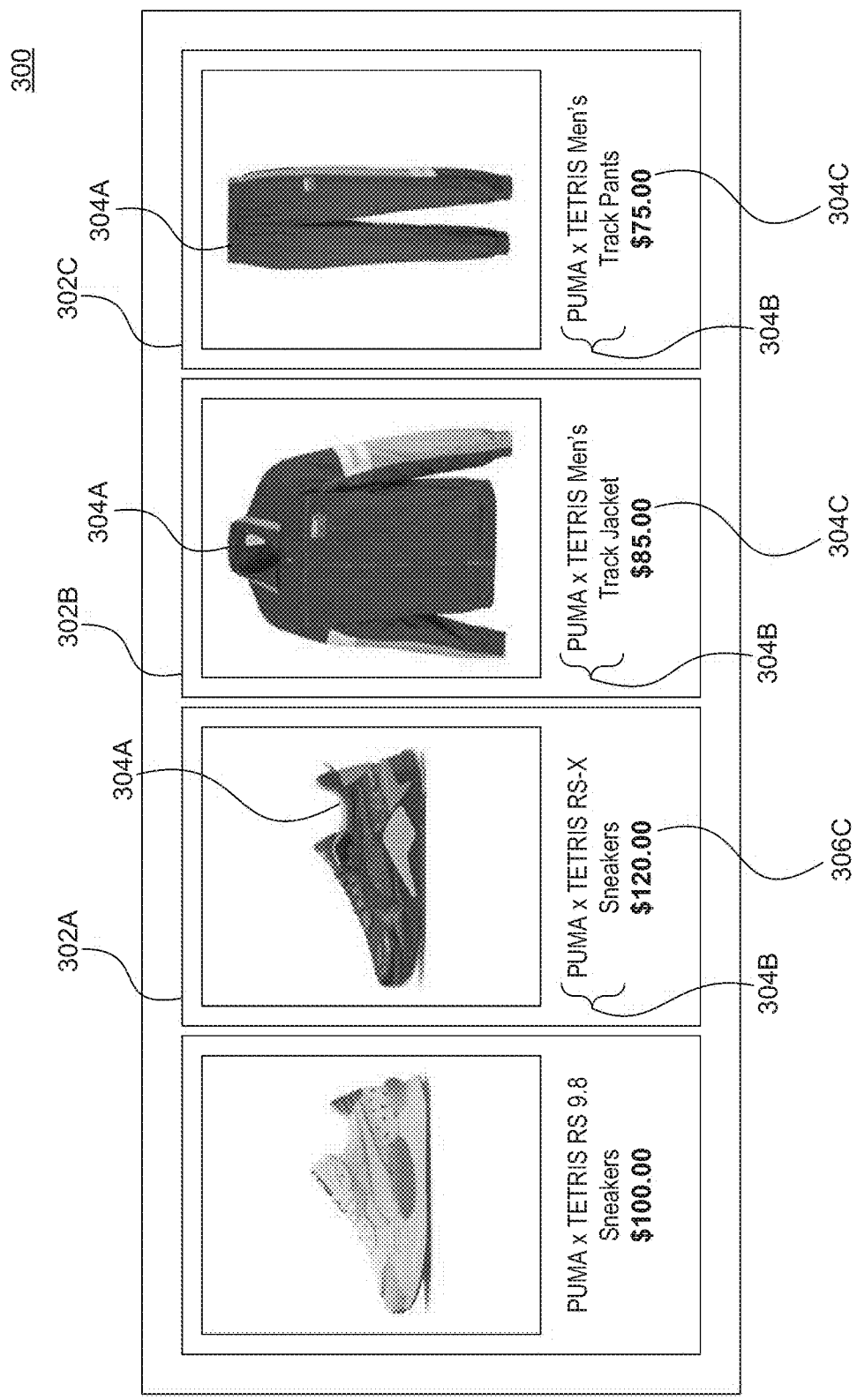
Figure 4:
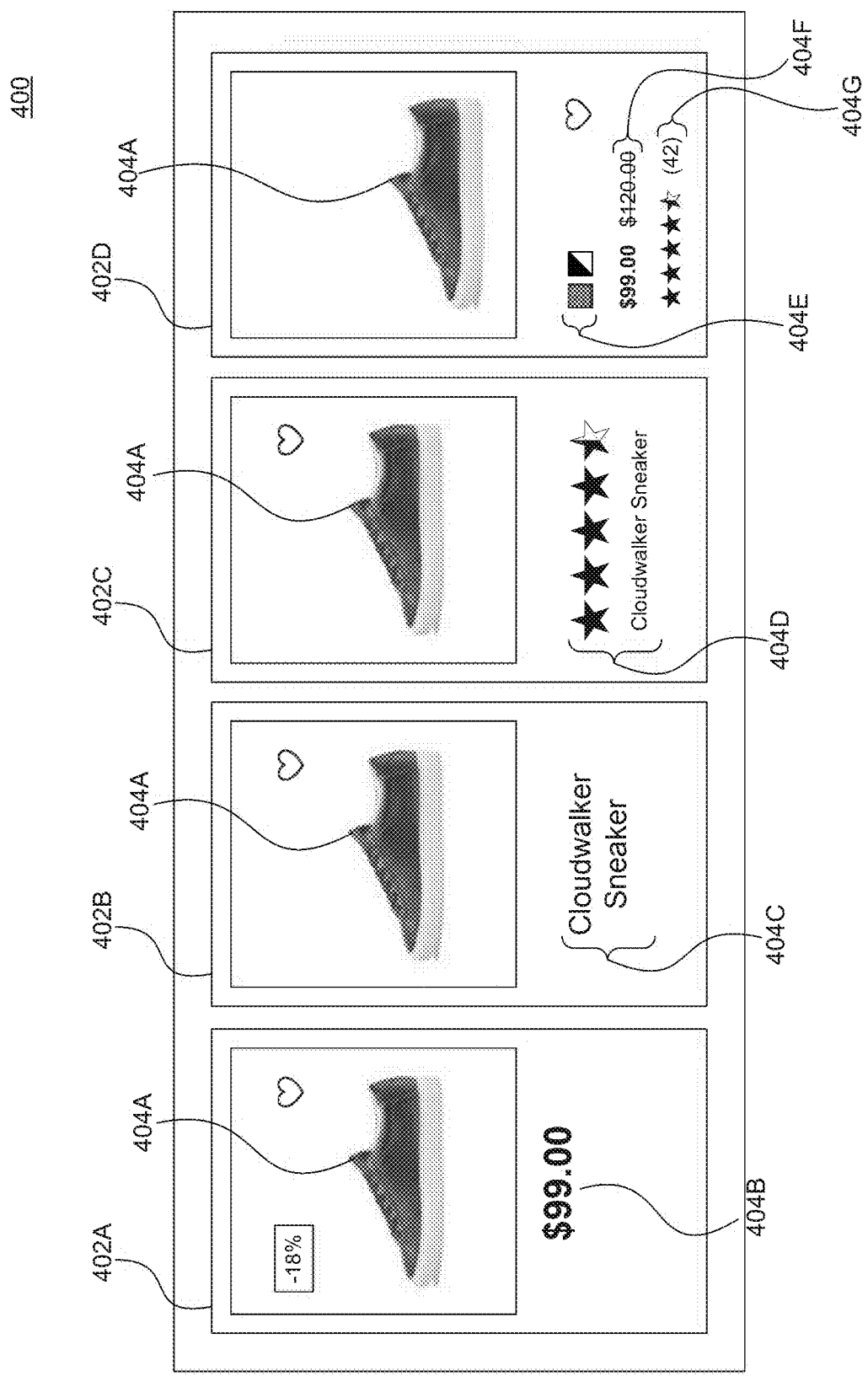

FIGS. 2-4 illustrate example user interfaces 200, 300, and 400 presenting records 202A-C, 302A-C, and 402A-D and associated attributes 202A-I, 302A-C, and 402A-C. In FIG. 2, user interface 200 presents records 202A-C of the same record type (i.e., restaurants). For each record 202A-C, user interface 200 presents the same attribute types (i.e., a picture, a star review, and a written review). In FIG. 3, user interface 300 presents records 302A-C of different types. Although the records 302A-C are of different types, user interface 300 presents different attribute types (i.e., a picture, a description, and a price) for each record 304A-C. In FIG. 4, user interface 400 presents records 402A-D having different attributes 404A-F. As illustrated, record 402A has attributes 404A-B, record 402B has attributes 404A and 404C, record 402C has attributes 404A and 404D, and record 402D has attributes 404A and 404E-G. As such, each record 402A-C has at least one different attribute type. Moreover, although not illustrated, a user interface may present different record types, which each have a different attribute type.

Figure 5:
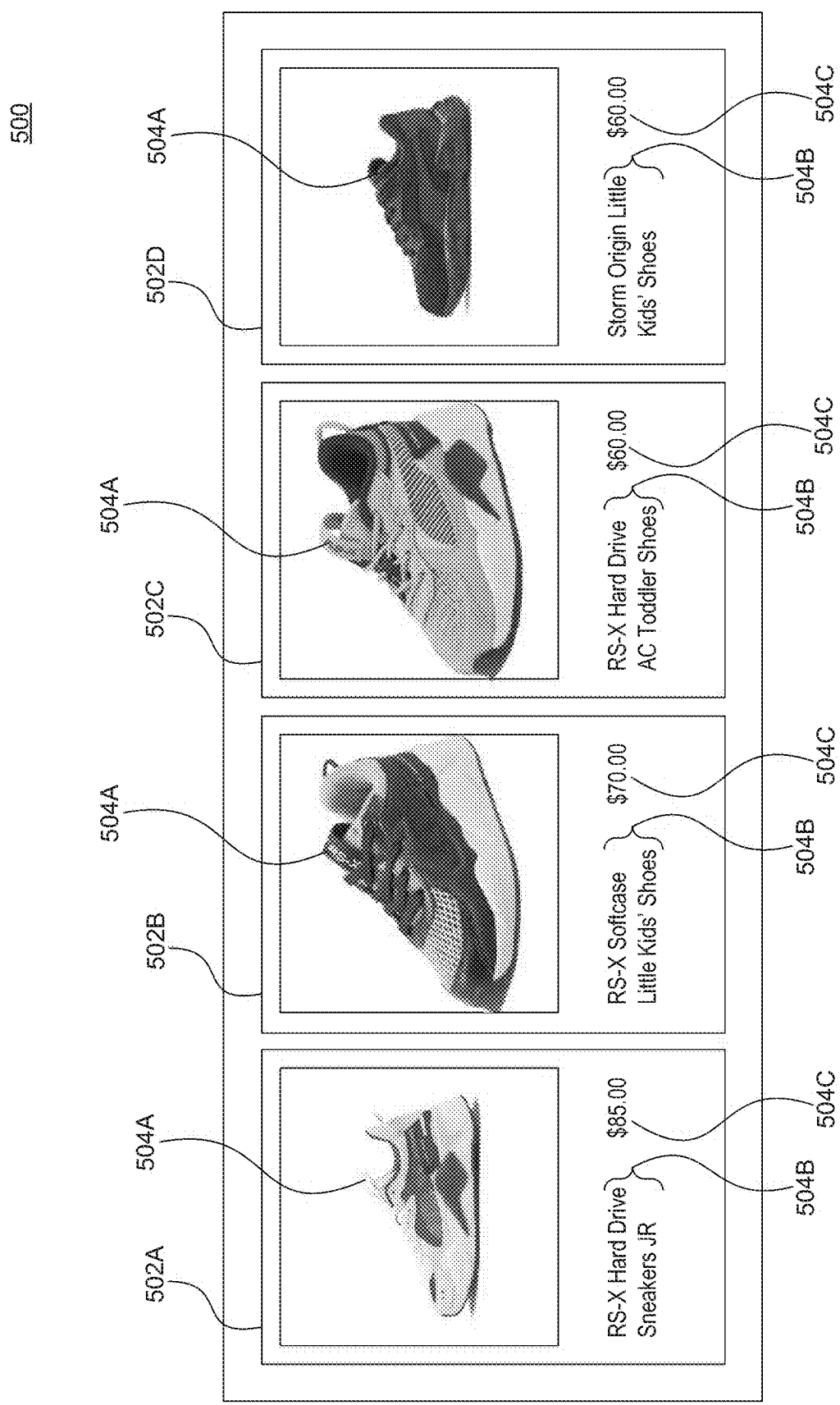
Figure 6:

FIG. 5 illustrates user interface 500 presenting records 502A-D and associated attributes 504A-C. In some embodiments, after selecting record 502C, frontend server 104 (of FIG. 1) may provide a new user interface for record 502C. FIG. 6 illustrates new user interface 600 for record 502C (of FIG. 5). User interface 600 presents additional (or new) associated attributes 602A-D for record 502. For record 402C, user interface 600's additional attributes 602A-D may be different or the same as user interface 500's attributes 504A-C.

Referring back to FIG. 1, in some embodiments, frontend server 104 may determine user-desired records and/or attributes based on user-presented records and/or attributes. For doing so, frontend server 104 may monitor a location of a hover box over user-presented records and/or attributes, monitor a viewing time of user-presented records and/or attributes, and/or identifying a selection of user-presented records and/or attributes. Frontend server 104 may send the user-desired records and/or attributes, along with the user-presented records and/or attributes, to the backend server 102.

Backend server 102 determines user-preferred record types and/or user-preferred attribute types. In some embodiments, backend server 102 includes profiler 110, recommendation module 112, and/or affinity profile module 114. Profiler 110 maintains user profiles comprising previously user-presented records and associated previously user-presented attributes. As such, upon receipt of user-presented records and/or attributes, profiler 110 identifies and stores them in an appropriate profile.

Similarly, affinity profile module 112 maintains user profiles comprising previously-determined user-preferred attribute types and/or record types. Affinity profile module 112 may also maintain previously determined z-scores, as will be discussed in more detail below, for previously-determined user-preferred attribute types and/or record types.

Recommendation module 112 determines a user-preferred record type and/or attribute type based on the user-desired record and/or attribute, respectively. In order to do so, recommendation module 112 may identify a user-desired type of the user-desired record or attribute. Thereafter, recommendation modules 112 determines the user-desired record type based on user-presented record types of the user-presented records, provided with or prior to user-desired record. Likewise, recommendation module 112 determines the user-preferred attribute type based on user-presented attribute types, provided with or prior to user-desired attributes.

Recommendation module 112 may then compare the user-desired type to the user-interface design variations of user-presented records and/or associated user-presented attributes. Based on the comparison, recommendation module 112 determines if the user-desired type meets or exceeds a predetermined threshold. In some embodiments, recommendation module 112 may utilize an analysis of variance (ANOVA) based on the design variations of the records and associated attributes. In some embodiments, the ANOVA may utilize an f-test.

Figure 7:
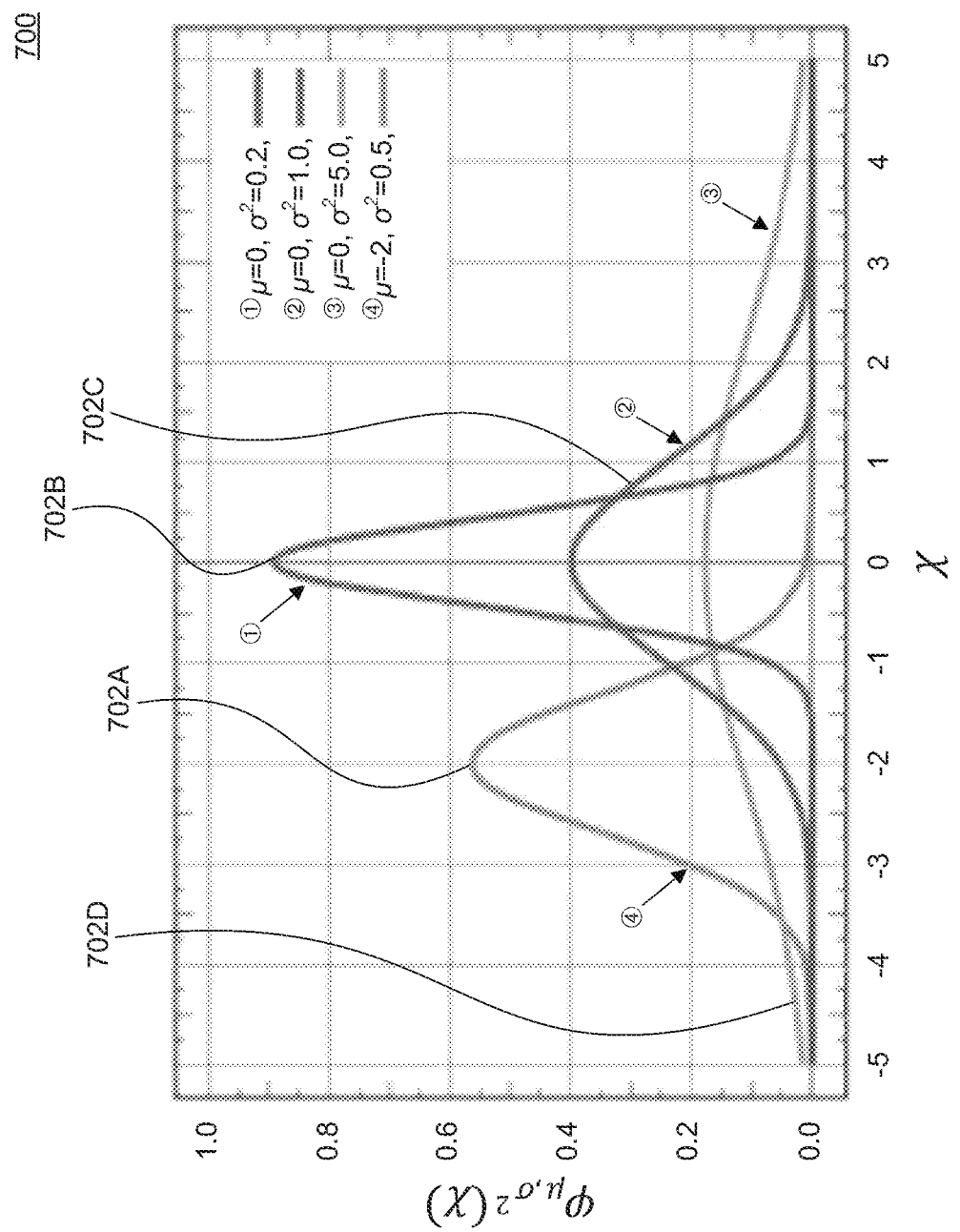
FIG. 7 is an f-test of an attribute, according to some embodiments.

FIG. 7 illustrates a graph 700 of distributions 702A-D of various records or attributes using an ANOVA that utilizes an f-test. As illustrated, the distributions 702A-D of the records or attributes may have different standard deviations. Accordingly, depending on the record or attribute, recommendation module 112 (of FIG. 1) determines a corresponding, predetermined threshold z-value. Thereafter, recommendation module 112 determines if a user-desired z-value of a particular record or attribute meets or exceeds a corresponding, predetermined threshold z-value. When the user-desired z-value meets or exceeds the corresponding, predetermined z-value, recommendation module 112 determines that the user-desired record or attribute type is the user-preferred record or attribute type. Otherwise, recommendation modules 112 determines that the user-desired record or attribute type is the user-preferred record or attribute type.

Referring back to FIG. 1, backend server 102 sends the user-preferred record or attribute type to frontend server 104. As discussed above, in some embodiments, backend server 102 may send the user-preferred record or attribute type after presenting records or attributes and receiving a user-desired record or attribute. Alternatively, backend server 102 may send the user-preferred record or attribute type prior to presenting records or attributes or receiving a user-desired record or attribute.

Figure 8:
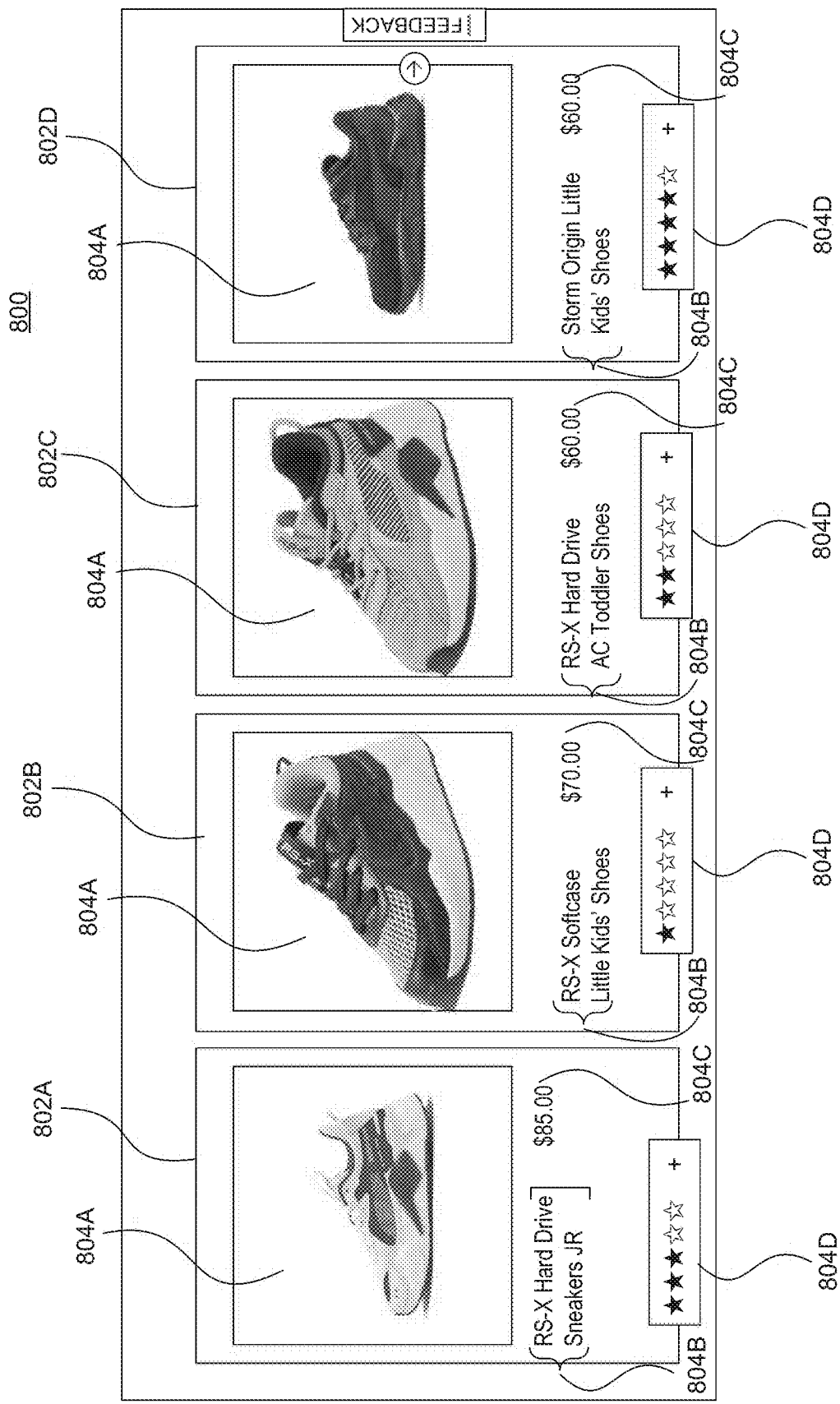
FIG. 8 is a user interface presenting records and associated attributes of user-preferred types, according to some embodiments.

Frontend server 104's application 108 may then send user interfaces comprising records or attributes of the user-preferred record or attribute type to user devices 106A-C. FIG. 8 illustrates a user interface 800 presenting records 802A-D and associated attributes 802A-D of user-preferred types. Specifically, records 802A-D relate to a user-preferred record type (i.e., shoes). Moreover, attribute 802C relate to a user-preferred attribute (i.e., a price range of $60.00 to $85.00). And, attribute 802 relates to another user-preferred attribute (i.e., a star review).

Figure 9:
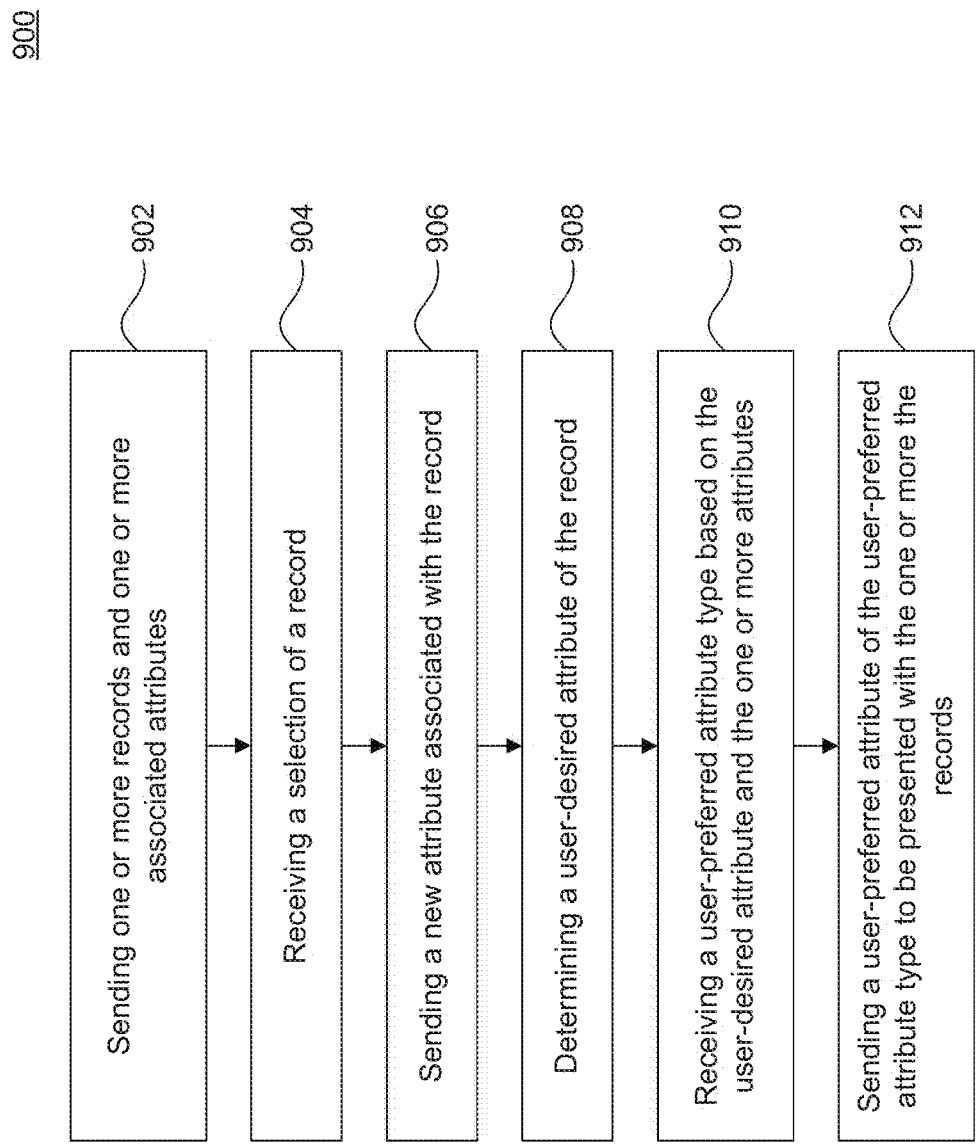
FIGS. 9 and 10 are flowcharts illustrating processes for determining user-preferred attribute types, according to some embodiments.
Figure 10:
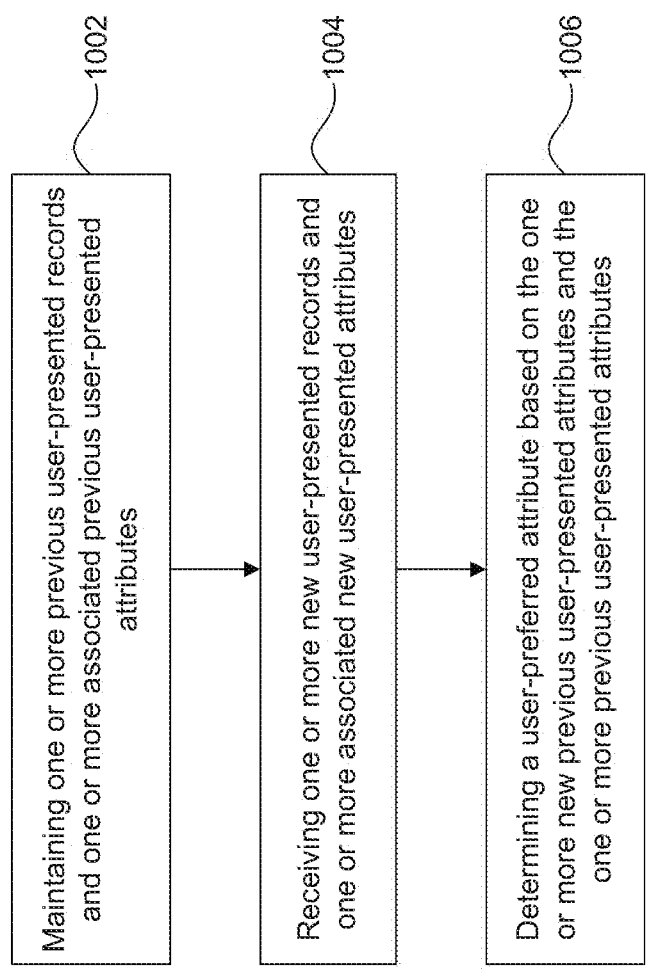

FIGS. 9 and 10 are flowcharts for methods 900 and 100 for providing user-preferred attribute types, according to an embodiment. Method 900 and 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIGS. 9 and 10, as will be understood by a person of ordinary skill in the art.

Referring now to FIG. 9, method 900 shall be described with reference to FIG. 1-7. However, method 900 is not limited to those example embodiments.

In 902, frontend server 104 via application 108 sends records 202A-C, 302A-C, 402A-D, or 502A-D and/or associated attributes 204A-I, 304A-C, 404A-C, or 504A-C to user devices 102A-C. As such, user devices 106A-C may present user interface 200, 300, 400, or 500 comprising records 202A-C, 302A-C, 402A-D, or 502A-D and associated attributes 204A-I, 304A-C, 404A-C, or 504A-C.

Along these lines, records 202A-C, 302A-C, 402A-D, or 502A-D and associated attributes 204A-I, 304A-C, 404A-C, or 504A-C may be of various types. For example, record types may be a product, a good, and/or a location, to provide a few examples. And, attribute types may be a color, a price, a description, an image, and/or a design, to provide a few examples.

Accordingly, in some embodiments, user interface 200 may provide records and/or attributes having the same properties. For example, user interface 200's records 202A-C are of the same record type (i.e., restaurants), and user interface 200's attributes 202 G-I are of the same attribute type (i.e., a picture, a review, and a description).

Alternatively, in some embodiments, user interface 300, 400, 500 may provide varying record and/or attribute types. For example, user interface 300 may provide records 302A-C of different types, and attributes 304A-C of the same type. User interface 400 may provide records 402A-C of the same type, and attributes 404A-C of different types.

As such, to provide various combinations of different record and/or attribute types, frontend server 104 may randomize the record and attribute types to provide different combinations. For example, frontend server 104 may utilize A/B or multivariate testing, although other randomized processes may be utilized as known to a person of ordinary skill.

In 904, optionally, frontend server 104 receives a selection of user interface 500's record 502C from user devices 102A-C.

In 906, after receiving the selection of user interface 500's record 502C from user devices 102A-C, frontend server 104's application 108 sends new attributes 602A-C associated with record 502. The new attributes 602A-C may be presented on user interface 600, which is provided after receiving a selection of user interface 500's record 502.

In 908, frontend server 104 determines user-desired attribute 602D of user-presented record 502. To do so, frontend server 104 may monitor a location of a hover box over the attributes 204A-I, 304A-C, 404A-C, or 504A-C, monitor a viewing time of the attributes 204A-I, 304A-C, 404A-C, or 504A-C, and/or receive a selection of the attributes 204A-I, 304A-C, 404A-C, or 504A-C, to provide a few examples.

In 910, frontend server 104 receives a user-preferred attribute type based on user-desired attribute 602C and/or user presented attributes 504A-C and 602A-D. Frontend server 104 may receive user-preferred attribute type from backend server 102. As discussed above, backend server 102 may determine the user-preferred attribute type using an ANOVA f-test, although other analyses of variances known to a person of ordinary skill of art may be utilized.

In 912, frontend server 104 sends a user-preferred attribute 804A-D of the user-preferred attribute type to be presented with records 802A-D to user devices 106A-C.

Referring now to FIG. 10, method 1000 shall be described with reference to FIG. 1-5. However, method 1000 is not limited to those example embodiments.

In 1002, backend server 104's profiler 110 maintains user profiles comprising previous user-presented records 202A-C, 302A-C, 402A-D, and 502A-D and/or user-presented attributes 204A-I, 304A-C, 404A-C, and 504A-C for different users. Backend server 102 may receive user-presented records 202A-C, 302A-C, 402A-D, or 502A-D and/or user-presented attributes 204A-I, 304A-C, 404A-C, or 504A-C from different providers (e.g., managing different frontend servers 102).

Backend server 102's profiler may also receive new user-presented records 202A-C, 302A-C, 402A-D, and 502A-D and/or associated user-presented attributes 204A-I, 304A-C, 404A-C, and 504A-C for a particular user. Profiler 110 may store new user-presented records 202A-C, 302A-C, 402A-D, and 502A-D user-presented attributes 204A-I, 304A-C, 404A-C, and 504A-C in the user profiles. In some embodiments, affinity profile module 114 maintains user profiles having previously-determined user-preferred attribute types and/or record types.

As stated above, records 202A-C, 302A-C, 402A-D, or 502A-D and attributes 204A-I, 304A-C, 404A-C, or 504A-C have various attributes. As described above, user-presented records 202A-C, 302A-C, 402A-D, or 502A-D and user-presented attributes 204A-I, 304A-C, 404A-C, or 504A-C may be presented to the user having the same or different properties.

In 1004, backend server 102 receives a user-desired attribute of the new or previous user-presented attributes 204A-I, 304A-C, 404A-C, and 504A-C, for example, via frontend server 104 of a particular provider.

In 1006, backend server 102 determines a user-preferred attribute based on the user-presented attributes, presented with or prior to the user-desired attribute.

Although the above methods are directed to determining user-preferred attribute types, a person of ordinary skill in the art would readily understand that the present disclosure also describes determining user-preferred record types.

Figure 11:
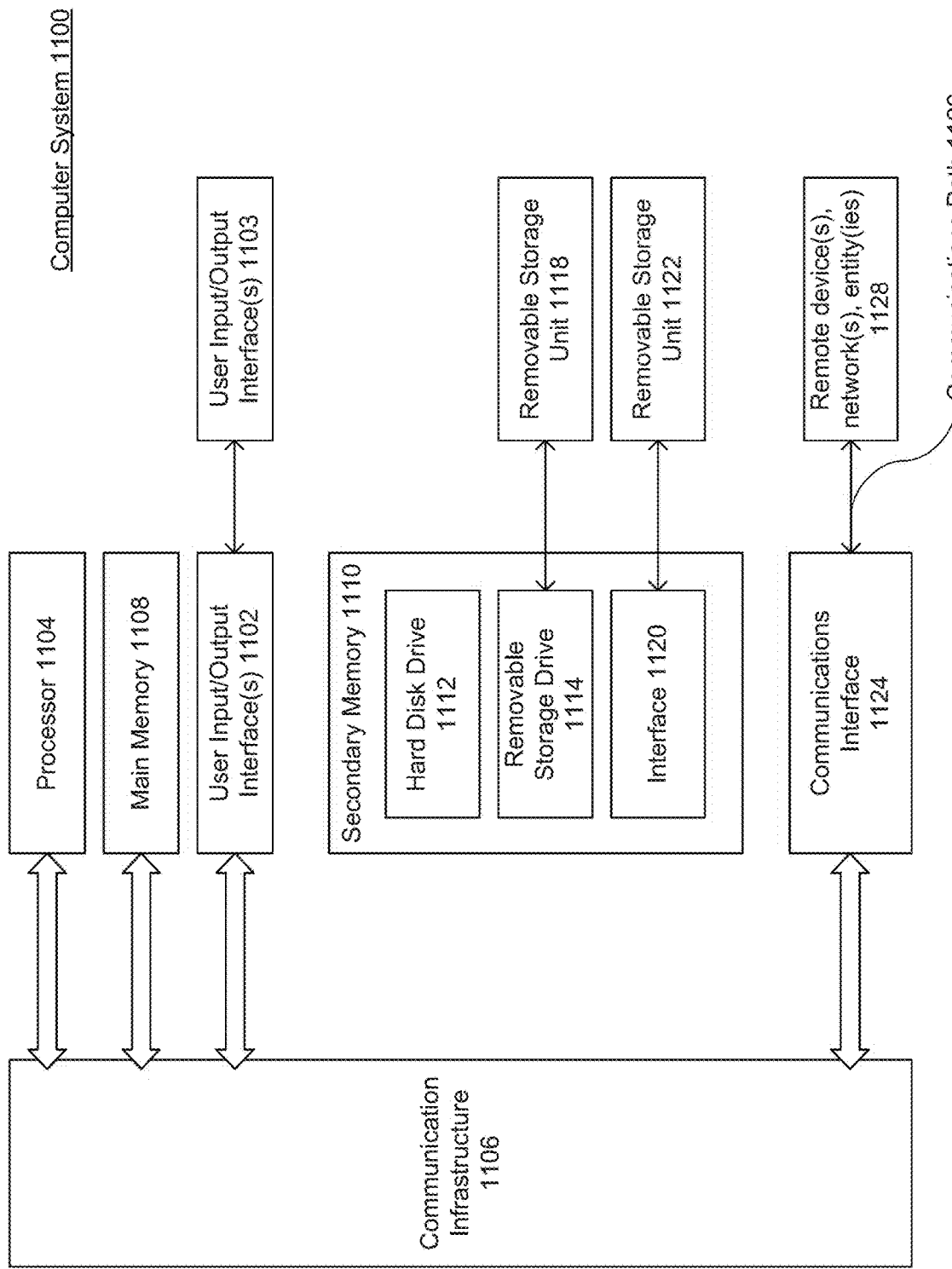
FIG. 11 is an example computer system or device useful for implementing various embodiments.

Various embodiments may be implemented, for example, using one or more well-known computer systems, such as computer system or device 1100 shown in FIG. 11. Computer system or device 1100 may be used, for example, to implement any of the embodiments discussed herein, as well as combinations and sub-combinations thereof.

Computer system or device 1100 may include one or more processors (also called central processing units, or CPUs), such as a processor 1104. Processor 1104 may be connected to a communication infrastructure or bus 1106.

Computer system or device 1100 may also include user input/output device(s) 1103, such as monitors, keyboards, pointing devices, etc., which may communicate with communication infrastructure or bus 1106 through user input/output interface(s) 1102.

One or more processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system or device 1100 may also include a main or primary memory 1108, such as random access memory (RAM). Main memory 1108 may include one or more levels of cache. Main memory 1108 may have stored therein control logic (i.e., computer software) and/or data.

Computer system or device 1100 may also include one or more secondary storage devices or memory 1111. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer-usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities, or other approaches for allowing computer programs and/or other instructions and/or data to be accessed by computer system or device 1100. Such means, devices, components, instrumentalities, or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system or device 1100 may further include a communication or network interface 1124. Communication interface 1124 may enable computer system or device 1100 to communicate and interact with any combination of external devices, external networks, external entities, etc. (individually and collectively referenced by reference number 1128). For example, communication interface 1124 may allow computer system or device 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system or device 1100 via communication path 1126.

Computer system or device 1100 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

Computer system or device 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system or device 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system or device 1100, main memory 1108, secondary memory 1110, and removable storage units 1118 and 1122, as well as tangible articles of manufacture embodying any combination of the foregoing. Such control logic, when executed by one or more data processing devices (such as computer system or device 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for determining a user-preferred feature type, comprising:
    maintaining, by at least one processor, one or more user-presented features associated with one or more user-presented records, wherein the one or more user-presented features comprise one or more user-presented feature types;
    receiving, by the at least one processor, one or more user-desired features of the one or more user-presented features determined based on user interactions with the one or more user-presented features; and
    determining, by the at least one processor, the user-preferred feature type of the one or more user-presented feature types based on the one or more user-presented features and the one or more user-desired features,
        wherein a new record and a new feature associated with the new record are to be presented, the new feature being of the user-preferred feature type.

2. The computer-implemented method of claim 1, the maintaining comprising:
    receiving, by the at least one processor, the one or more user-presented features.

3. The computer-implemented method of claim 1, further comprising:
    receiving, by the at least one processor, one or more user-desired records of the one or more user-presented records,
        wherein the one or more user-presented records comprises one or more user-presented record types, and
        wherein the one or more user-desired records are determined based on user interactions with the one or more user-presented records; and
    determining, by the at least one processor, a user-preferred record type of the one or more user-presented record types based on the one or more user-presented records and the one or more user-desired records,
    wherein the new record is of the user-preferred record type.

4. The computer-implemented method of claim 1, further comprising:
    receiving by the at least one processor, one or more user-desired records of the one or more user-presented records,
        wherein the one or more user-desired records are determined based on user interactions with the one or more user-presented records; and
    determining, by the at least one processor, a user-preferred record type based on the one or more user-presented records and the one or more user-desired records,
        wherein the new record is of a type different from the one or more user-presented records.

5. The computer-implemented method of claim 1, wherein:
    the one or more user-presented records comprise a first and second user-presented record, and
    the first user-presented record is presented concurrently with the second-user-presented record.

6. The computer-implemented method of claim 1, wherein:
    the one or more user-presented records comprise a first and second user-presented record, and
    the first user-presented record is presented before or after the second-user-presented record.

7. The computer-implemented method of claim 6, wherein:
    the one or more user-presented features comprise a first and second user-presented feature having a first and second user-presented feature type, respectively, and
    the first user-presented record and the second-user-presented record are associated with the first user-presented feature and the second user-presented feature, respectively,
        wherein the user-preferred feature is the first user-presented feature or the second user-presented feature.

8. The computer-implemented method of claim 7, wherein the second user-presented record and the second user-presented feature are presented after the first user-presented record and the first user-presented feature.

9. The computer-implemented method of claim 8, wherein the user-preferred feature type is the second user-presented feature type.

10. The computer-implemented method of claim 1, wherein the one or more user-desired features are determined by one or more of:
    monitoring a location of a hover box over the one or more user-presented features,
    monitoring a viewing time of the one or more user-presented features, and
    receiving a selection of the one or more user-presented features.

11. The computer-implemented method of claim 1, the determining of the user-preferred feature type comprising:
    performing an analysis of variance (ANOVA) based on the one or more user-desired features and the one or more user-presented features;
    determining a variance of the one or more user-desired features based on the ANOVA;
    determining that the variance of the one or more user-desired features meets or exceeds a predetermined variance; and
    identifying the one or more user-desired features being of a specific feature type, wherein the specific feature type is the user-preferred feature type.

12. The computer-implemented method of claim 11, wherein the ANOVA utilizes an f-test.

13. The computer-implemented method of claim 12, the determining of the variance comprising:
    determining a z-score of the user-preferred feature type based on the ANOVA; and
    determining that the z-score meets or exceeds a predetermined z-score threshold.

14. The computer-implemented method of claim 1, further comprising:
    providing, by the at least one processor, the user-preferred feature type to a first source, wherein the one or more user-presented features are provided by a second source different from the first source.

15. The computer-implemented method of claim 1, further comprising:

providing, by the at least one processor, the user-preferred feature type to a first provider providing the one or more user-presented features.

16. The computer-implemented method of claim 15, further comprising:
receiving, by the at least one processor, the one or more user-presented features from the first provider.

17. The computer-implemented method of claim 15, further comprising:
receiving, by the at least one processor, the one or more user-presented features from a second provider different from the first provider.

18. The computer-implemented method of claim 1, wherein the user-preferred feature type and the user-desired feature relate to a price, a review, a description, a design, or a location.

19. A system, comprising:
a memory; and
at least one processor coupled to the memory and configured to:
maintain one or more user-presented features associated with one or more user-presented records, wherein the one or more user-presented features comprise one or more user-presented feature types;
receive one or more user-desired features of the one or more user-presented features determined based on user interactions with the one or more user-presented features; and
determine a user-preferred feature type of the one or more user-presented feature types based on the one or more user-presented features and the one or more user-desired features,
wherein a new record and a new feature associated with the new record are to be presented, the new feature being of the user-preferred feature type.

20. A non-transitory computer-readable device having instructions stored thereon that, when executed by at least one computing device, cause the at least one computing device to perform operations comprising:
presenting one or more features associated with one or more records to a user, wherein the one or more user-presented features comprise one or more user-presented feature types;
receiving a selection of the one or more user-desired features of the one or more user-presented features from the user;
receiving a user-preferred feature type based on the one or more user-presented features and the one or more user-desired features; and
presenting a new record and a new feature of the user-preferred feature type, wherein the new feature is associated with the new record.

* * * * *

UNITED STATES PATENT AND TRADEMARK OFFICE
CERTIFICATE OF CORRECTION

| | |
|---|---|
| PATENT NO. | : 11,822,608 B2 |
| APPLICATION NO. | : 17/972258 |
| DATED | : November 21, 2023 |
| INVENTOR(S) | : Lonsdorf et al. |

It is certified that error appears in the above-identified patent and that said Letters Patent is hereby corrected as shown below:

In the Drawings

On Sheet 2 of 11, FIG. 2, and on the Title Page, the illustrative figure, Tag 204I, Line 2, delete "initiallyl" and insert -- initially --, therefor.

On Sheet 9 of 11, FIG. 9, Tag 912, Line 2, after "more", delete "the".

In the Specification

In Column 4, Line 62, delete "FIG." and insert -- FIGS. --, therefor.

In Column 5, Line 60, delete "FIG." and insert -- FIGS. --, therefor.

Signed and Sealed this
Thirteenth Day of February, 2024

*Katherine Kelly Vidal*

Katherine Kelly Vidal
*Director of the United States Patent and Trademark Office*